May 27, 1952   R. REGER   2,598,439
SPEED CONTROL FOR PRESSURE FLUID OPERABLE ROTATOR
Filed March 5, 1948
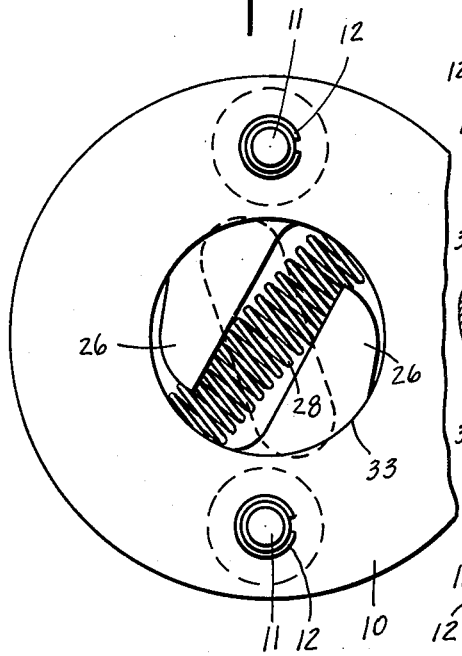
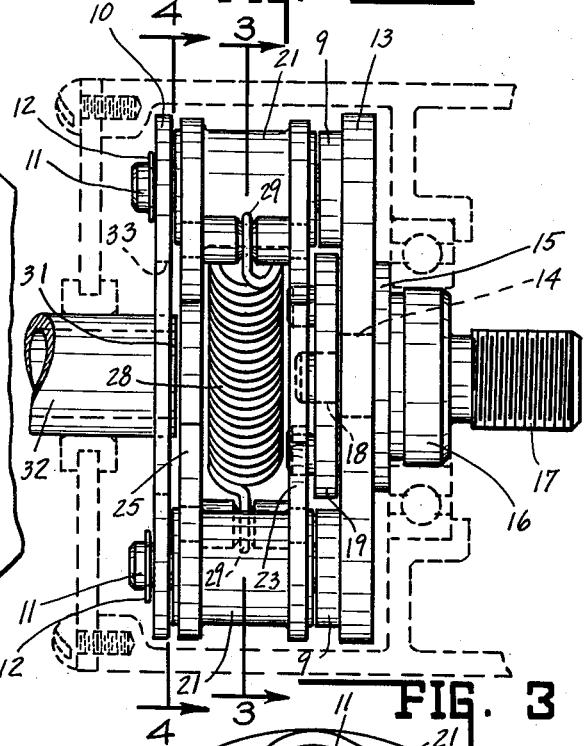
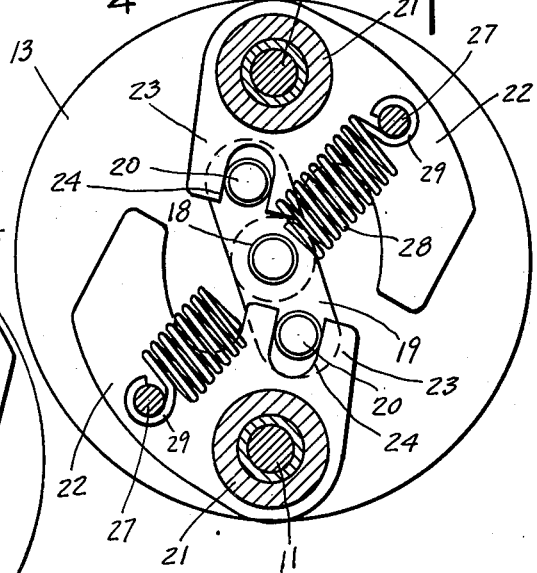
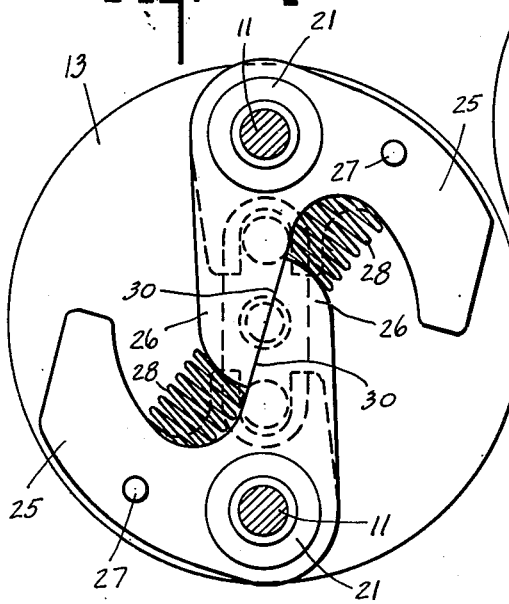
INVENTOR.
RAYMOND REGER.
BY
Lockwood, Goldsmith & Galt,
ATTORNEYS.

Patented May 27, 1952

2,598,439

UNITED STATES PATENT OFFICE 2,598,439

SPEED CONTROL FOR PRESSURE FLUID OPERABLE ROTATOR

Raymond Reger, Anderson, Ind., assignor to The Pierce Governor Company, Inc., Anderson, Ind., a corporation Application March 5, 1948, Serial No. 13,265

3 Claims. (Cl. 137—140)

This invention relates to a centrifugally operable valve structure.

For purposes of illustration the motor whereby rotational power is applied is intentionally omitted for same may partake of any one of several forms such as a casing, said casing being leakage sealed relative to the pressure fluid supply line, the casing enveloping the governor, the latter rotating with the power, such as a turbine rotor, said rotor carrying in outboard relation a rotatable power operable tool.

The chief object of the present invention is to provide a centrifugally operable valve that maintains substantially constant speed.

The chief feature of the present invention resides in a plurality of centrifugally operable cooperating valve members each being formed as an extension of a governor weight.

In the present invention, the weights are disposed in a pressure chamber within the casing aforesaid, and hence the pressure therein varies as valve position varies, so that the power pressure discharged from that chamber varies in accordance with the pressure therein.

At light loads the pressure would tend to rise thereby increasing weight speeds. This effects proportional cut-off. At heavy loads the weight speed would tend to decrease thus opening the valve.

By this invention, therefore, centrifugal valve control is constant and approximates constant speed for variable loads.

Other objects and features of the invention will be set forth more fully hereinafter.

The full nature of the invention will be understood from the accompanying drawings and the following description and claims.

In the drawings—

Fig. 1 is an end view of the governor and valve members associated therewith, the pressure supply conduit controlled by the latter being omitted.

Fig. 2 is a side elevation of the pressure supply tube, the centrifugal governor and valve members, dotted lines diagrammatically indicating one form of casing in which the governor and valve members are contained.

Fig. 3 is a transverse sectional view taken on line 3—3 of Fig. 2 and in the direction of the arrows. Fig. 4 is a similar view taken on line 4—4 of Fig. 2 and in the direction of the arrows.

In Fig. 1, 10 indicates a circular centrally apertured base plate mounted upon studs 11 and retained by clip anchors 12.

These studs are carried by a base plate 13 in turn carried by shaft 14 having hub flange 15, bearing portion 16 and threaded extension 17 for connection to a source of rotational power.

Shaft 14 is reduced at 18 and oscillatably supports bar 19 carrying pins 20 at the ends. Oscillatable on each stud 11 is a sleeve 21 suitably bushed as shown. On the end of sleeve 21, adjacent base plate 13, is an arm 22 with angular extension 23 (in effect a bell crank) longitudinally slotted as at 24 to take pin 20 carried by bar 19. Spacer 9 disposes arm 22 to clear bar 19.

The other end of sleeve 21, adjacent base plate 10, has secured thereto an arm 25 with extension 26. A pin 27, remote from pivot stud 11, connects arms 22 and 25 together. The free ends of said two arms constitute the centrifugally operable weight.

There are two such structures provided and a coil spring 28 has ends 29 coiled about pins 27 or otherwise suitably secured to said weights. This is the load spring of the centrifugal device and normally constrains the parts to the positions shown in Figs. 1 and 3 wherein the valve is open.

Whenever shaft 17 is sufficiently rotated so that the centrifugal force generated progressively overcomes the force of the load spring, the arms dispose the extensions 26 closer and closer together until at top speed the two arms have their confronting edge faces 30 abutting each other as shown in Fig. 4.

When in this position they completely blank or close the end 31 of the pressure fluid supply tube 32, see Fig. 2, that projects into and through aperture 33 in plate 10. As the speed lowers due to this cutoff, the spring 28 becomes progressively more effective to draw the weights together which in turn progressively opens the jaws 26 of the valve to permit progressively more power providing pressure fluid to flow to the prime mover for speed increase. The pin and slot associated bar and arms insure simultaneous arm movement and to the same degree.

The foregoing structure is not only applicable to the constant speed control of oil, steam, gas or air operable power units but may be utilized for many other devices using or utilizing other fluids as well as those named.

Essentially the invention is directed to confronting cooperating jaw type valve elements disposable across the face of a discharge conduit or the like and centrifugally controlled by a coaxially disposed speed responsive device.

The foregoing constitutes a disclosure of the preferred form of the invention but same is not limited thereto so reference is had to the appended claims for the definitions thereof.

The invention claimed is:

1. A centrifugally controlled valve comprising in combination a pair of spaced rotatable plates, diametrically disposed members connecting said plates together, a pair of coplanar centrifugal valve members oppositely disposed and pivotally supported by the said plates, said valve members having straight engageable faces which when engaged comprise a complete shut-off valve, and a second pair of centrifugally operated members pivotally mounted between said plates and operatively connected with said centrifugally operated valve members, and means for effecting unitary movement of said second pair of centrifugally operated members, and means for biasing said second pair of centrifugally operated members in one direction.

2. A centrifugally controlled valve structure comprising a pair of spaced apart rotatable plates, a pair of centrifugally operated valve members each comprising a bell crank member, one arm of which has a straight edge for complementary engagement with the corresponding arm of the opposite member and comprising when engaged a cut-off plate, a second pair of centrifugally operated members operatively connected to said first pair and each comprising a bell crank lever, each of said second pair of bell crank levers having one arm thereof bifurcated and an oscillatory member having pins engaging between the bifurcated arms of said members to provide coinstant movement thereof and a coiled spring biasing said second pair of centrifugal members in one direction.

3. A valve structure for controlling the opening of a supply conduit comprising a pair of multi-arm weights, parallel pivots therefor, each weight having an extension forming a bladed valve, the blades having coplanar relation at all times and confronting complementary straight engageable edges effective when engaged for cutoff purposes, a second opposed extension on each weight, said second extensions being coplanar and directed toward each other, spring means normally constraining the weights to collapsed position and overpowered by centrifugal force for blade movement, a conjoining member, and pin and slot connections between said conjoining member and said second mentioned extensions.

RAYMOND REGER.

REFERENCES CITED

The following references are of record in the file of this patent:

UNITED STATES PATENTS

| Number | Name | Date |
|---|---|---|
| 444,938 | Kinkaid | Jan. 20, 1891 |
| 898,689 | Sawyer | Sept. 15, 1908 |
| 1,069,541 | Fox | Aug. 5, 1913 |
| 1,257,630 | Newton | Feb. 26, 1918 |
| 1,506,862 | Parsons | Sept. 2, 1924 |
| 1,720,652 | Van Hamersveld | July 9, 1929 |
| 1,729,032 | Cook | Sept. 24, 1929 |
| 1,972,552 | Stover | Feb. 26, 1935 |